(12) United States Patent
Jang et al.

(10) Patent No.: US 8,306,585 B2
(45) Date of Patent: Nov. 6, 2012

(54) SLIDE TYPE MOBILE TERMINAL WITH TILTABLE SLIDE MODULE

(75) Inventors: Chang-Yong Jang, Seoul (KR); Min-Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 388 days.

(21) Appl. No.: 12/507,666

(22) Filed: Jul. 22, 2009

(65) Prior Publication Data

US 2010/0035669 A1    Feb. 11, 2010

(30) Foreign Application Priority Data

Aug. 6, 2008  (KR) .................. 10-2008-0077127

(51) Int. Cl.
 *H04M 1/00*    (2006.01)
(52) U.S. Cl. .................. 455/575.4; 361/679.3
(58) Field of Classification Search .............. 455/550.1, 455/575.1, 575.4, 575.8, 90.3; 379/433.11, 379/433.12, 433.13; 361/679.3
See application file for complete search history.

(56) References Cited

U.S. PATENT DOCUMENTS

| | | | | |
|---|---|---|---|---|
| 7,200,428 | B2 * | 4/2007 | Taninai ................. | 455/575.3 |
| 7,583,496 | B2 * | 9/2009 | Lai ....................... | 361/679.3 |
| 2006/0252471 | A1 * | 11/2006 | Pan ....................... | 455/575.4 |
| 2007/0123179 | A1 | 5/2007 | Lim | |
| 2008/0132302 | A1 * | 6/2008 | Schechtel et al. ......... | 455/575.4 |
| 2009/0170573 | A1 * | 7/2009 | Harmon et al. ........... | 455/575.4 |

FOREIGN PATENT DOCUMENTS

| | | |
|---|---|---|
| JP | 2006-186577 | 7/2006 |
| KR | 10-2006-0031019 | 4/2006 |

* cited by examiner

*Primary Examiner* — Ping Hsieh

(74) *Attorney, Agent, or Firm* — Lee, Hong, Degerman, Kang & Waimey

(57) ABSTRACT

A mobile terminal is provided. The mobile terminal includes an upper body, a lower body, and a slide module connecting the upper and lower bodies, where the slide module is configured to slidably move the upper body in a first linear motion relative to the lower body and to tilt the upper body at an angle relative to the lower body in a second motion. The slide module includes an upper slide member fixed to the upper body, a lower slide member fixed to the lower body, and at least one cam portion formed on the upper slide member such that the at least one cam portion is configured to contact the lower slide member when the upper slide member is moved toward an open configuration using the first motion, wherein the contact causes the upper slide member to tilt when the upper slide member is moved to the open configuration using the second motion.

25 Claims, 11 Drawing Sheets

SLIDE TYPE MOBILE TERMINAL WITH TILTABLE SLIDE MODULE

CROSS-REFERENCE TO RELATED APPLICATIONS

Pursuant to 35 U.S.C. §119(a), this application claims the benefit of earlier filing date and right of priority to Korean Patent Application No. 10-2008-0077127, filed on Aug. 6, 2008, the contents of which are incorporated by reference herein in their entirety.

FIELD OF THE INVENTION

The present invention relates to slide type mobile terminals, and more particularly, to a slide type mobile terminal with a tiltable slide module.

DESCRIPTION OF THE RELATED ART

Mobile terminals are portable devices, which can provide users with various services such as a voice calling service, a video calling service, an information input/output service, and a data storage service.

As the types of services provided by mobile terminals are increasingly diversified, mobile terminals have been evolving into multimedia players. For example, mobile terminals are being equipped with various functions such as capturing photos or moving pictures, playing music files or moving image files, executing game programs, receiving broadcast programs and providing wireless Internet services.

Slide type mobile terminals generally include an upper body and a lower body which are slidably connected to one another. The upper body and the lower body are configured to slidably move relative to one another to achieve an open configuration and a closed configuration. However, the upper and lower bodies are typically disposed in parallel in the open and closed configurations which, among other disadvantages, provides inconvenient viewing angles to the user.

SUMMARY OF THE INVENTION

In one aspect of the present invention, a mobile terminal is provided. The mobile terminal includes an upper body, a lower body and a slide module connecting the upper and lower bodies, where the slide module is configured to slidably move the upper body in a first linear motion relative to the lower body and to tilt the upper body at an angle relative to the lower body in a second motion.

The slide module includes an upper slide member fixed to the upper body, a lower slide member fixed to the lower body, and at least one cam portion formed on the upper slide member such that the at least one cam portion is configured to contact the lower slide member when the upper slide member is moved toward an open configuration using the first motion, where the contact causes the upper slide member to tilt when the upper slide member is moved to the open configuration using the second motion.

It is contemplated that the lower body includes a recessed portion formed on an upper surface of the lower body and that a first side of the upper body is situated in the recessed portion in the open configuration. It is further contemplated that the recessed portion comprises an incline relative to a sliding direction of the upper body toward the open configuration.

It is contemplated that the lower slide member comprises an inclined surface corresponding to the incline of the recessed portion and that the lower slide member is fixed on a mounting groove formed on the recessed portion.

It is contemplated that slide rails formed on each side of the lower slide member define an area where the upper slide member slidably engages the lower slide member and enable tilting of the upper slide member. It is further contemplated that the slide rails each include a rail groove having a height which gradually increases towards a sliding direction of the upper body for achieving a closed configuration.

It is contemplated that an inner surface of each of the slide rails includes a curved portion configured to reduce a friction between the slide rail and the at least one cam portion.

It is contemplated that a rolling portion is situated on a lower surface of the upper body, where the rolling portion is configured to be in contact with an upper surface of the lower body. It is further contemplated that at least one rolling portion is situated on each of the slide rails, where the at least one rolling portion is configured to contact a side of the upper slide member.

It is contemplated that a first width of the first side of the upper body is less than a second width of a second side of the lower body, where the first side is opposite to the second side, and where a third width of the recessed portion corresponds to the first width. It is further contemplated that a first width of the first side of the upper body is less than a second width of a second side of the upper body, the first and second sides being opposite to one another, and where the first width corresponds to the third width of the recessed portion.

It is contemplated that first and second edges of the upper body comprise lateral recessed portions, wherein a distance between the lateral recessed portions corresponds to the third width of the recessed portion.

It is contemplated that the at least one cam portion is situated on an upper surface of the upper slide member and includes an inclined surface along one direction.

It is contemplated that the upper body includes a first display unit for displaying a first screen and the lower body includes a second display unit for displaying a second screen, where the second screen in associated with the first screen.

In another aspect of the present invention, a mobile terminal is provided. The mobile terminal includes an upper body, a lower body including a recessed portion on a upper surface of the lower body, and a slide module connecting the upper and lower bodies, where the slide module is configured to slidably move the upper body in a first linear motion relative to the lower body and to tilt the upper body at an angle relative to the lower body in a second motion, wherein one side of the upper body is situated in the recessed portion.

The slide module includes an upper slide member fixed to the upper body, a lower slide member fixed to the lower body, and at least one cam portion formed on the upper slide member such that the at least one cam portion is configured to contact the lower slide member when the upper slide member is moved toward an open configuration using the first motion, wherein the contact causes the upper slide member to tilt when the upper slide member is moved to the open configuration using the second motion.

It is contemplated that slide rails formed on each side of the lower slide member define an area where the upper slide member slidably engages the lower slide member and enable tilting of the upper slide member. It is further contemplated that the slide rails each comprise a rail groove having a height which gradually increases towards a sliding direction of the upper body for achieving a closed configuration.

It is contemplate that an inner surface of each of the slide rails includes a curved portion configured to reduce a friction between the slide rail and the at least one cam portion.

It is contemplated that the mobile terminal includes a rolling portion situated on a lower surface of the upper body, where the rolling portion is configured to be in contact with the upper surface of the lower body. It is further contemplate that the mobile terminal includes at least one rolling portion situated on each of the slide rails, where the at least one rolling portion is configured to contact a side of the upper slide member.

It is contemplated that a first width of the first side of the upper body is less than a second width of a second side of the lower body, where the first side is opposite to the second side, and where a third width of the recessed portion corresponds to the first width. It is further contemplated that a first width of the first side of the upper body is less than a second width of a second side of the upper body, the first and second sides being opposite to one another, and where the first width corresponds to the third width of the recessed portion.

It is contemplated that first and second edges of the upper body include lateral recessed portions, where a distance between the lateral recessed portions corresponds to the third width of the recessed portion. It is further contemplated that the at least one cam portion is situated on an upper surface of the upper slide member and includes an inclined surface along one direction.

It is contemplated that the upper body includes a first display unit for displaying a first screen and the lower body comprises a second display unit for displaying a second screen, where the second screen in associated with the first screen.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

The present invention will hereinafter be described in detail with reference to the accompanying drawings in which exemplary embodiments of the invention are shown.

Hereinafter, a mobile terminal related to the present invention will be described in detail with reference to the accompanying drawings.

Figure 1A:
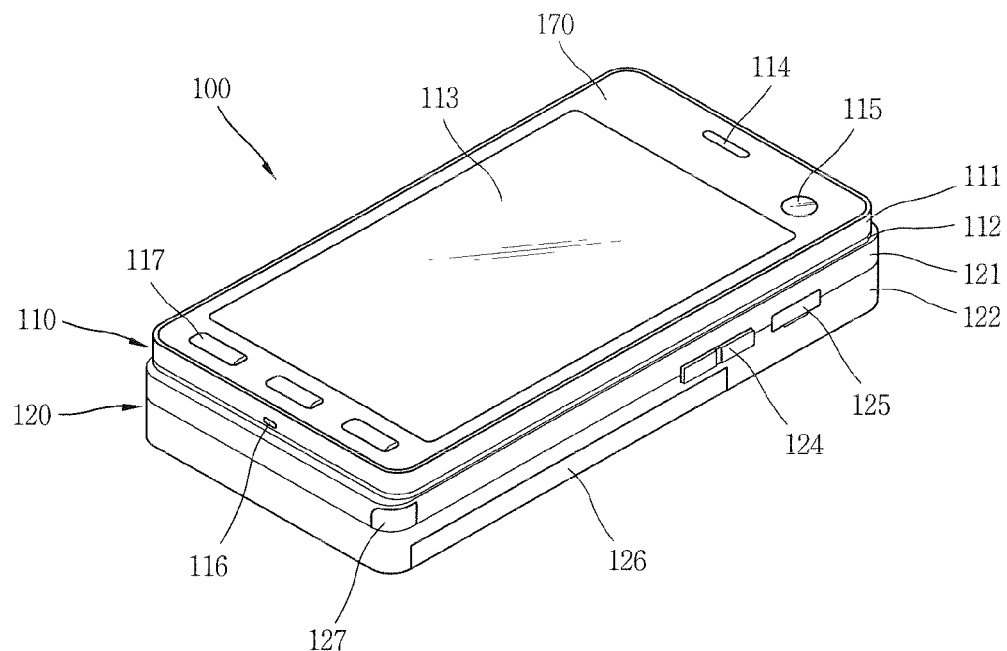
FIGS. 1A and 1B are front perspective views of a mobile terminal 100 in accordance with one embodiment of the present invention.
Figure 1B:
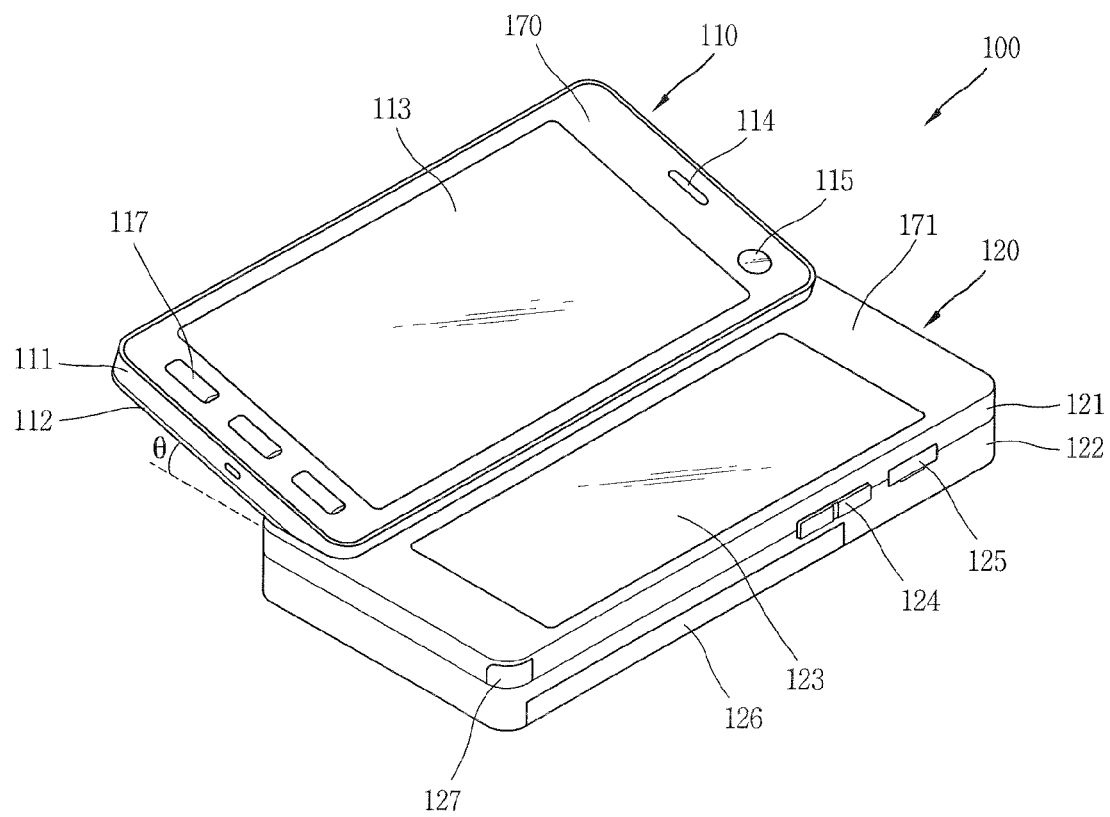

FIGS. 1A and 1B are front perspective views of a mobile terminal 100 in accordance with one embodiment of the present invention.

As shown in FIG. 1A, the mobile terminal 100 includes an upper body 110 and a lower body 120. The upper body 110 and the lower body 120 are connected and are configured to slide relative to one another.

As shown in FIG. 1A, the configuration in which the upper body 110 overlaps the lower body 120 is herein referred to as a "closed configuration," and the configuration in which the upper body 110 exposes at least a portion of the lower body 120, as shown in FIG. 1B, is herein referred to as an "open configuration."

In the embodiment of FIG. 1A, the upper body 110 is slidably connected to the lower body 120 to allow the upper body 110 to slide in a widthwise direction relative to the lower body 120. Such a configuration allows the first display unit 113 to provide a "widescreen" view when the mobile terminal 100 performs a multimedia function. In other embodiments, the upper body 110 can be configured to slide in a lengthwise direction relative to the lower body 120.

As shown in FIG. 1A, the upper body 110 is substantially parallel to the lower body 120 in the closed configuration, whereas the upper body 110 is raised at a predetermined angle with respect to the lower body 120 in the open configuration, as shown in FIG. 1B. Thus, as the configuration of the mobile terminal 100 is changed from the closed configuration of FIG. 1A to the open configuration of FIG. 1B, one end of the upper body 110 is raised relative to the lower body, while another end of the upper body 110 is lowered relative to the lower body 120.

As shown in FIGS. 1A and 1B, the upper body 110 includes a front case 111 and a rear case 112, and the lower body 120 includes a front case 121 and a rear case 122. It should be understood that various electronic components can be installed in the space between the front case 111 and the rear case 112, and in the space between the front case 121 and the rear case 122.

For example, the front cases 111 and 121 and the rear cases 112 and 122 can be formed by injection-molding of a synthetic resin. Alternatively, the front cases 111 and 121 and the rear cases 112 and 122 can be formed of a metallic material, such as stainless steel (STS) or titanium (Ti).

As shown in FIGS. 1A and 1B, the upper body 110 of the mobile terminal 100 includes a first display unit 113 located on a front surface 170 of the front case 111, a first audio output unit 114, a first image input unit 115, an audio input unit 116, and a first manipulation unit 117.

The first display unit 113, for example, can be a Liquid Crystal Display ("LCD") module or an Organic Light Emitting Diode ("OLED") module, which can be configured to visually display information. The first display unit 113 can further include a touch screen to allow a user to input information via a touch input.

The audio output unit 114, for example, can be implemented as a receiver or a speaker and the first image input unit 115 can be implemented as a camera module for capturing an image or video.

The audio input unit 116, for example, can be implemented as a microphone to receive a voice of the user or other sounds and the first manipulation unit 117 can be configured to receive commands for controlling an operation of the mobile terminal 100.

For example, the first manipulation unit 117, also referred to in the art as a "manipulating portion," can be implemented as a tactile input device, such as a dome switch, a touch screen, a touch pad, a joystick, or a wheel or jog dial for rotating a key. In one embodiment, the first manipulation unit 117 can be configured to receive a command or information according to an input provided by the user. For example, the first manipulation unit 117 can be configured to receive an input command, such as a "start" command, an "end" command, or a "scroll" command.

As shown in FIG. 1B, the lower body 120 includes a second display unit 123 located on a front surface 171 of the front case 121, a second manipulation unit 124, and an interface 125, The second display unit 123 can be, for example, a Liquid Crystal Display ("LCD") module or an Organic Light Emitting Diode ("OLED") module, which can be configured to visually display information. The second display unit 123 can further include a touch screen to allow a user to input information via a touch input.

For example, the second manipulation unit 124, which can also be referred to as a "manipulating portion," can be implemented as a tactile input device, such as a dome switch, a touch screen, a touch pad, a joystick, or a wheel or jog dial for rotating a key. In one embodiment, the second manipulation unit 124 can be configured to receive a command or information according to an input provided by the user. For example, the second manipulation unit 123 can be configured as a hot key for performing a specific function, such as activating the first image input unit 115.

In one embodiment, the interface 125 can be a communication port for enabling data exchange between the mobile terminal 100 and an external device. For example, the interface 125 can be a port for connecting an earphone via a fixed or wireless connection, a port for short range communication (e.g., an Infrared Data Association (IrDA) port, a wireless LAN port, or a Bluetooth™ port), or a power supply port for supplying power to the mobile terminal 100.

In another embodiment, the interface 125 can be a card socket for receiving an external card such as a Subscriber Identification Module (SIM), a User Identity Module (UIM), or a memory card for storing information.

As shown in FIGS. 1A and 1B, a power supply unit 126 is mounted at a side of the rear case 122 to supply power to the mobile terminal 100. The power supply unit 126 can be, for example, a rechargeable battery that can be detached.

As further shown in FIGS. 1A and 1B, a broadcast signal reception antenna 127 is located at a side of the rear case 122 in addition to an antenna used for call communication. The antenna 127 can be configured to be extractable from the lower body 120.

Figure 2:
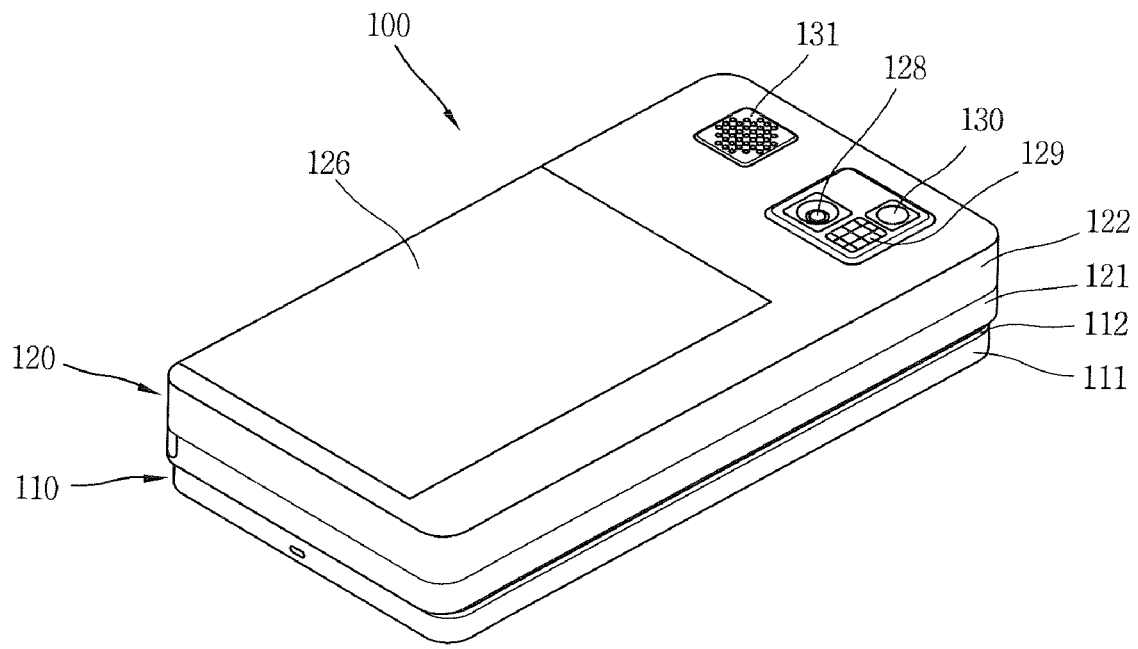
FIG. 2 is a rear perspective view of the mobile terminal 100 in accordance with one embodiment of the present invention.

FIG. 2 is a rear perspective view of the mobile terminal 100 in accordance with one embodiment of the present invention.

As shown in FIG. 2, a second image input unit 128 is located on the rear case 122 of the lower body 120. The second image input unit 128 has a direction of view which is substantially opposite to the direction of view of the first image input unit 115 shown in FIGS. 1A and 1B.

In one embodiment, the first image input unit 115 can be configured to operate with a relatively lower resolution than the second image input unit 128. For example, the first image input unit 115 can be used to capture an image of the user to allow immediate transmission of the image during a video call and the second image input unit 128 can be used to capture images of general objects with high picture quality, which may not require immediate transmission in real-time, but may be stored for later viewing or use.

Additional camera related components, such as a flash 129 and a mirror unit 130 are disposed near the second image input unit 128. The mirror unit 130 allows self-image capturing by allowing the user to see herself when the user desires to capture her own image using the second image input unit 128. The flash 129 can illuminate a subject when the second image input unit 128 captures an image of the subject.

As shown in FIG. 2, a second audio output unit 131 is located on the rear case 122. The second audio output unit 131 can be implemented to perform a stereophonic function in conjunction with the first audio output unit 114 shown in FIGS. 1A and 1B, and can be also used to output sounds during a call in a speaker phone mode.

It should be understood that in other embodiments, the second image input unit 128, the flash 129, the mirror unit 130, and/or the second audio output unit 131 can be located on the upper body 110, and in particular, on the rear case 112. In such embodiments, the second image input unit 128, the flash 129, the mirror unit 130, and/or the second audio output unit 131 can be protected by the lower body 120 in the closed configuration. Furthermore, in an embodiment not including the second image input unit 128, the first image input unit 115 can be configured to rotate to allow image capturing in the direction of view of the second image input unit 128.

Figure 3:
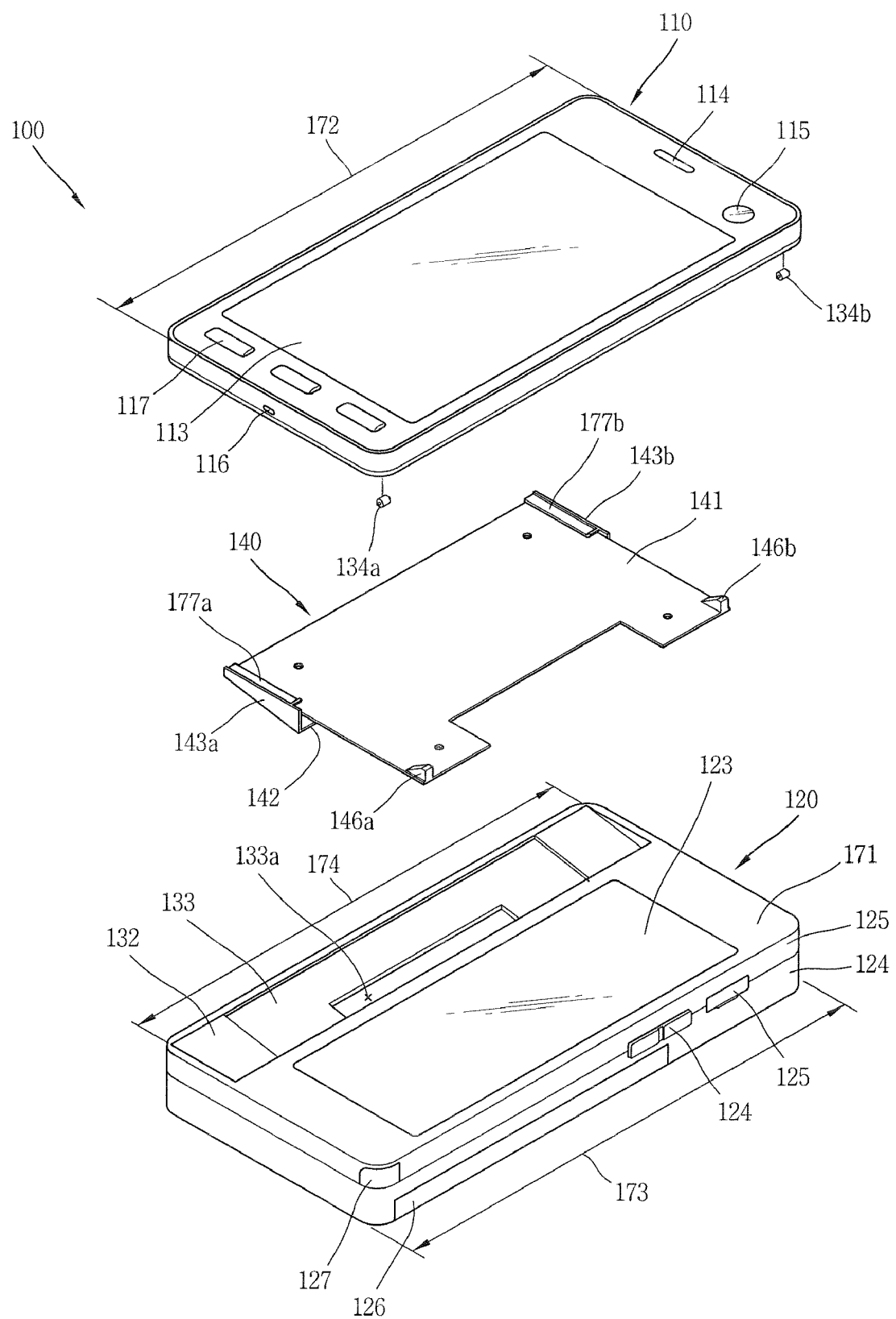
FIG. 3 is an exploded perspective view of the mobile terminal 100 in accordance with one embodiment of the present invention.

FIG. 3 is an exploded perspective view of the mobile terminal 100 in accordance with one embodiment of the present invention.

As shown in FIG. 3, the lower body 120 includes a recessed portion 132 for receiving one end of the upper body 110 in the open configuration. The recessed portion 132 is formed on the upper surface 171 of the lower body 120 and along one side of the second display unit 123. Thus, with reference to FIG. 1B, one end of the upper body 110 is received by the recessed portion 132 and locked in position when the mobile terminal 100 is in the open configuration.

As also shown in FIG. 3, the recessed portion 132 includes an incline relative to the sliding direction of the upper body 110 when the mobile terminal 100 is placed in the open configuration. In one embodiment, the angle of the incline determines the angle at which the upper body 110 is raised in the open configuration.

As further shown in FIG. 3, the upper body 110 has a width 172, which is less than a width 173 of the lower body 120. The width 172 of the upper body 110 corresponds to the width 174 of the recessed portion 132. In the embodiment of FIG. 3, the widths 172, 173, and 174 are configured to prevent the sides of the recessed portion 132 from being exposed to the sides of the lower body 120.

As shown in FIG. 3, a slide module 140 for slidably connecting the upper and lower bodies 110 and 120 is mounted between the upper body 110 and the lower body 120.

The slide module 140 includes an upper slide member 141 fixed to the bottom surface of the upper body 110. The slide module 140 further includes a lower slide member 142 fixed to the lower body 120. The upper slide member 141 and the lower slide member 142 are slidably connected and can slide relative to one another.

In one embodiment, the upper slide member 141 can be formed in a plate shape and can be configured to move along slide rails, such as the slide rails 143a and 143b shown in FIG. 3, formed on the sides of the lower slide member 142.

Figure 4:
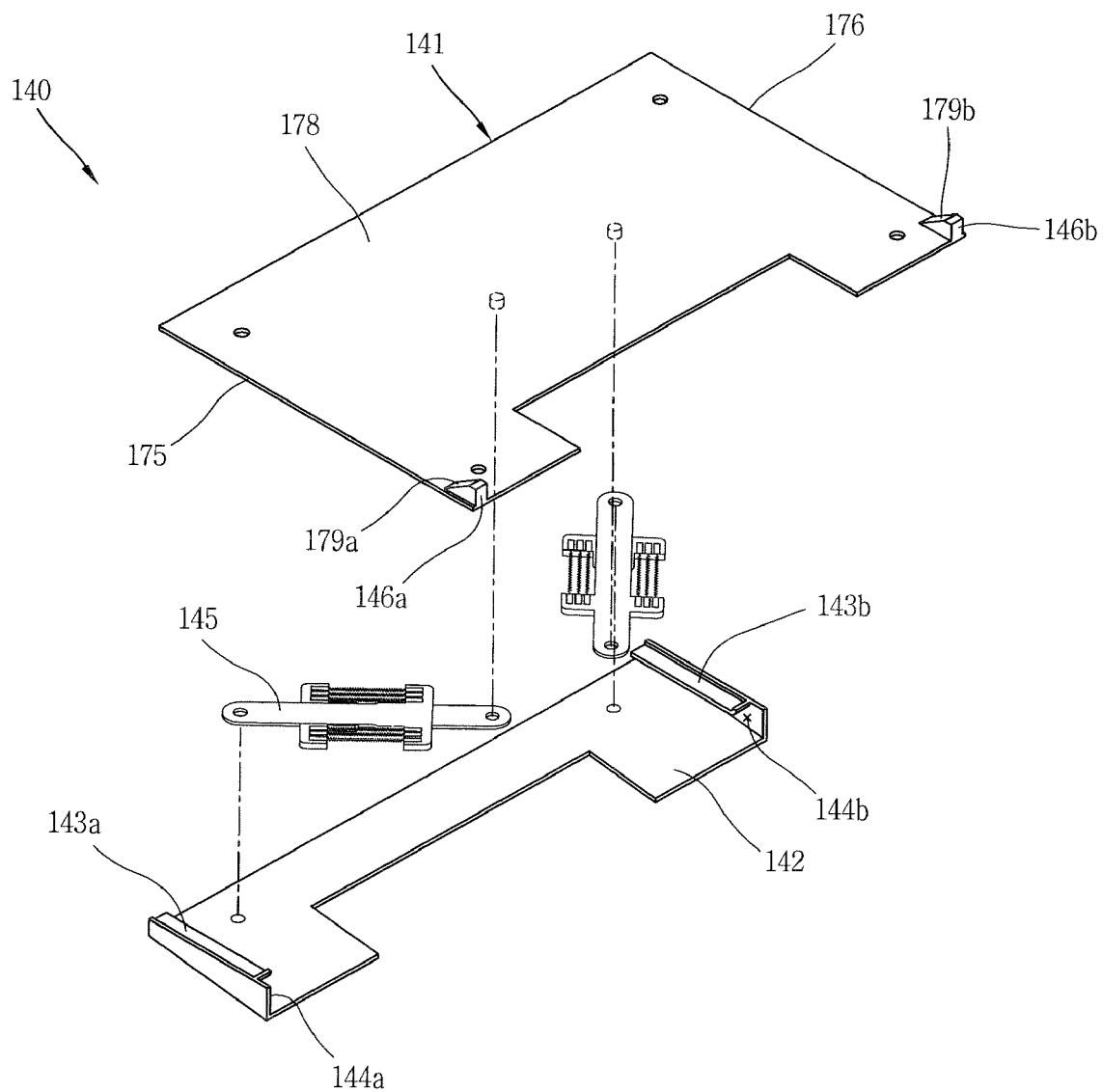
FIG. 4 is an exploded perspective view of the slide module 140 in accordance with one embodiment of the invention.

FIG. 4 is an exploded perspective view of the slide module 140 in accordance with one embodiment of the invention.

As shown in FIG. 4, each of the slide rails 143a and 143b is configured to wrap around a corresponding lateral edge of the upper slide member 141, such as the lateral edges 175 and 176. As further shown in FIG. 4, the slide rail 143a includes a rail groove 144a, and the slide rail 143b includes a rail groove 144b. The rail grooves 144a and 144b can be moveably engaged by the upper slide member 141.

As shown in FIG. 4, at least one spring module 145 is mounted between the upper slide member 141 and the lower slide member 142. The at least one spring module 145 is configured to provide an elastic force between the upper slide member 141 and the lower slide member 142 when the upper slide member 141 and the lower slide member 142 are moved relative to one another. The least one spring module 145 is known in the art and therefore, the details of the at least one spring module 145 will not be discussed herein to maintain brevity.

Referring back to FIG. 3, the lower slide member 142 is mounted on a mounting groove 133 formed in the recessed portion 132. The bottom surface of the lower slide member 142 is fixed to the mounting groove 133. In the embodiment of FIG. 3, the mounting groove 133 includes a connector hole 133a for allowing passage of a flexible printed circuit board or other electrical connections between the upper and lower bodies 110 and 120.

As shown in FIG. 4, the bottom surface of the lower slide member 142 is configured to form an incline corresponding to the incline of the recessed portion 132. The upper surface 177a of the rail groove 144a and the upper surface 177b of the rail groove 144b are oriented in parallel to the upper surface 171 of the lower body 120. Therefore, a height of the rail grooves 144a and 144b gradually increases towards the sliding direction of the upper body 110 for achieving the closed configuration. As such, the lower slide member 142 provides adequate space via the rail grooves 144a and 144b to allow the upper slide member 141 to tilt in the open configuration.

As further shown in FIG. 4, the cam portions 146a and 146b are formed on an upper surface 178 of the upper slide member 141. In the embodiment of FIG. 4, the cam portions 146a and 146b are configured to contact the lower slide member 142 when the mobile terminal 100 is in the open configuration. As shown in FIG. 4, the cam portions 146a and 146b include corresponding cam surfaces 179a and 179b, which are inclined along one direction.

As the upper slide member 141 is slidably moved to achieve the open configuration, the cam portions 146a and 146b contact the corresponding inner surfaces of the slide rails 143a and 143b and cause the upper slide member 141 to be inclined at a predetermined angle with respect to the lower body 120.

Referring back to FIG. 3, rolling portions 134a and 134b which are configured to contact and roll on the upper surface 171 of the lower body 120 can be mounted on the lower surface, that is, the rear case 112, of the upper body 110. The rolling portions 134a and 134b provide a smoother sliding movement with respect to the upper and lower bodies 110 and 120. In another embodiment, the rolling portions 134a and 134b can each be implemented as a roller or a ball rotatably mounted on the lower body 120.

An exemplary operation of the slide module 140 will now be described.

Figure 5A:
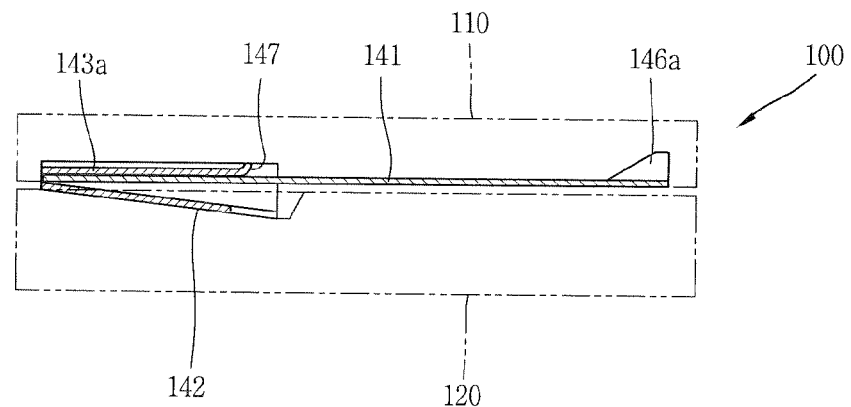
FIGS. 5A through 5C are cross sectional views of the mobile terminal 100 showing an exemplary operation of the slide module 140 in accordance with one embodiment of the present invention.
Figure 5B:
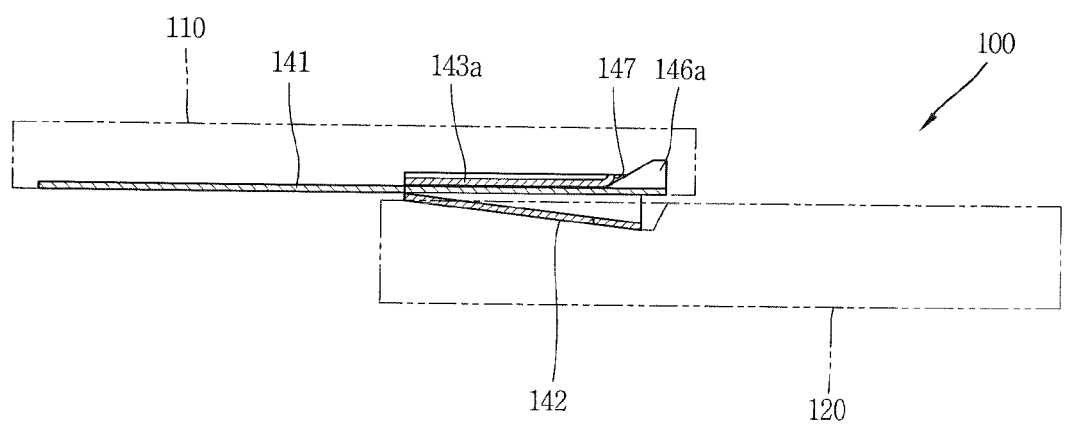
Figure 5C:
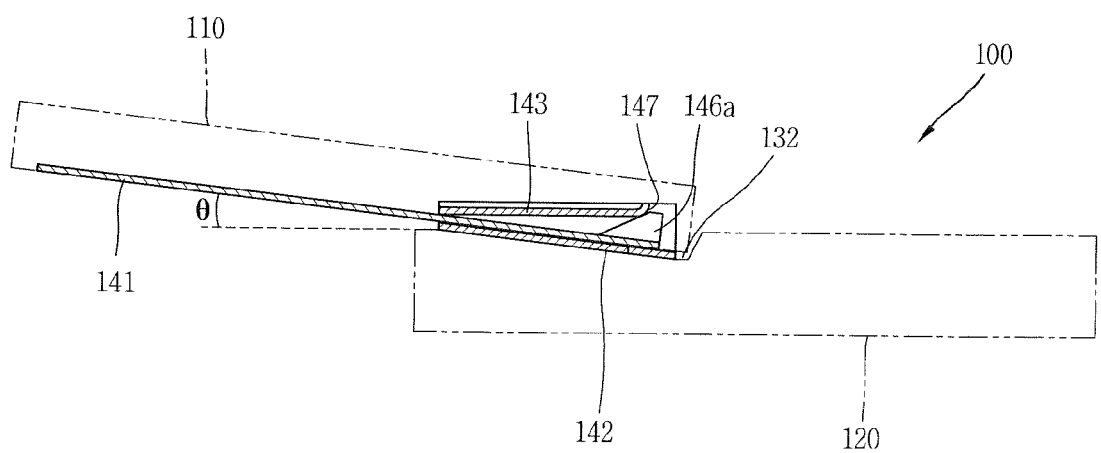

FIGS. 5A through 5C are cross sectional views of the mobile terminal 100 showing an exemplary operation of the slide module 140 in accordance with one embodiment of the present invention.

FIG. 5A shows the mobile terminal 100 in the closed configuration. As shown in FIG. 5A, the upper body 110 is parallel to the lower body 120 in the closed configuration of the mobile terminal 100.

FIG. 5B shows the mobile terminal 100 in a state where the upper body 110 is slidably moved relative to the lower body 120, such that the cam portion 146a contacts the lower slide member 142. In one embodiment, when the upper body 110 is moved a predetermined distance relative to the lower body 120, the upper body 110 is automatically moved by an elastic force provided by the spring module 145 shown in FIG. 4.

As shown in FIG. 5B, a curved portion 147 located on an inner surface of the slide rail 143a is configured to reduce the friction between the slide rail 143a and the cam portion 146a. For example, the slide rail 143a can be formed to have the curved portion 147 or alternatively, the curved portion 147 can be attached to the inner surface of the slide rail 143a as a separate member.

As shown in FIG. 5C, the cam portion 146a guides one end of the upper body 110 into the recessed portion 132 as the cam portion 146a is brought into contact with the curved portion 147. As further shown in FIG. 5C, the upper slide member 141 is tilted to a predetermined angle relative to the lower body 120 when the upper slide member 141 is positioned parallel to the lower surface of the lower slide member 142. As a result, one end of the upper body 110 is lowered and locked in the recessed portion 132, while the other end of the upper body 110 is raised to the predetermined angle with respect to the lower body 120.

With respect to the embodiments of FIGS. 5A through 5C, it can be appreciated that the movement of the upper body 110 relative to the lower body 120 can be improved by implementing the rolling portions 134a and 134b discussed above.

Once the mobile terminal 100 is in the open configuration as shown in FIG. 5C, the user can slidably move the upper body 110 to place the mobile terminal 100 in the closed configuration. As the upper body 110 is moved toward the closed configuration, the cam portion 146a of the upper slide member 141 moves along the curved portion 147 of the lower slide member 142 and returns the upper slide member 141 to the original position. Therefore, as shown in FIG. 5B, the upper body 110 is rotatably moved and oriented in parallel to the lower body 120 and then moved to the closed position as shown in FIG. 5A.

Figure 6:
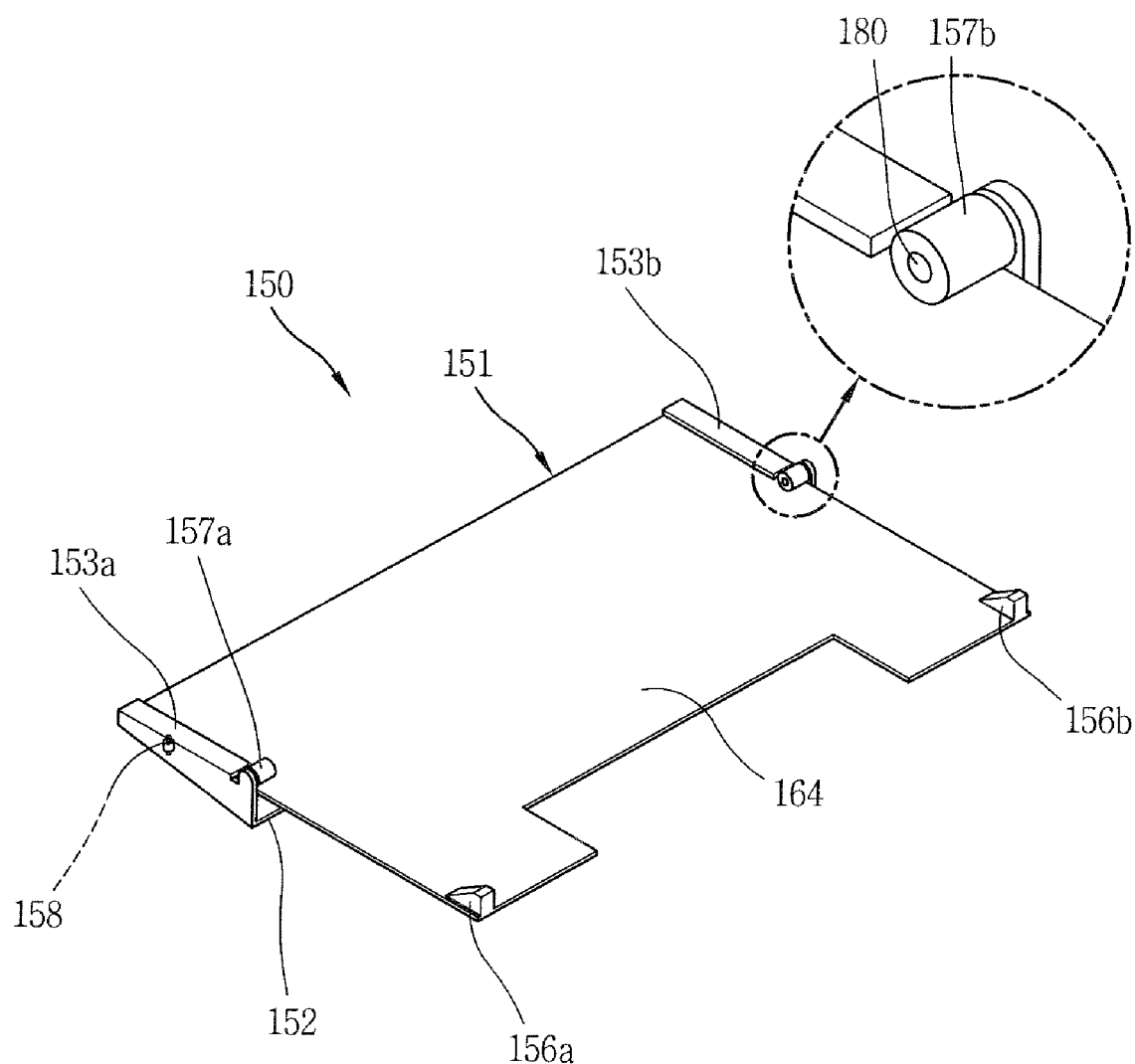
FIG. 6 is a perspective view of a slide module 150 in accordance with one embodiment of the present invention.

FIG. 6 is a perspective view of a slide module 150 in accordance with one embodiment of the present invention.

The slide module 150 in FIG. 6 includes upper and lower slide members 151 and 152, slide rails 153a and 153b, and cam portions 156a and 156b, which correspond respectively to the upper and lower slide members 141 and 142, the slide rails 143a and 143b, and the cam portions 146a and 146b shown in FIG. 4. As shown in FIG. 6, the slide module 150 further includes the rollers 157a and 157b.

As shown in FIG. 6, the upper and lower slide members 151 and 152 are slidably connected and can slide relative to one another. As further shown in FIG. 6, the cam portions 156a and 156b are formed on the upper slide member 151 and are configured to tilt the upper slide member 151 at a predetermined angle relative to the lower body 120 in the open configuration.

The slide module 150 includes rolling portions 157a and 157b for improving the movement of the cam portions 156a and 156b during operation of the cam portions 156a and 156b. The rolling portions 157a and 157b can each be implemented as a roller which is rotatably mounted on a rotational shaft 180 extending from a side of the lower slide member 152, as shown in the detail of roller portion 157b in FIG. 6.

The roller portions 157a and 157b are configured to rotate in the direction of movement of the upper slide member 151. As shown in FIG. 6, the roller portions 157a and 157b maintain contact with the upper surface 164 of the upper slide member 151 as the upper slide member 151 is slideably moved until the roller portions 157a and 157b respectively contact the cam portions 156a and 156b.

As shown in FIG. 6, an additional rolling portion, such as the rolling portion 158, can be mounted on each of the side rails, such as the slide rail 153a of the lower slide member 152. The rolling portion 158 can be implemented, for example, as a roller which is rotatably mounted on a rotational shaft formed on a side of the slide rail 153. The rolling portion 158 can be configured to contact the sides of the upper slide member 151. Thus, the rolling portion 158 can be in rolling contact with the side of the upper slide member 151 to facilitate and improve a sliding movement of the upper slide member 151.

Figure 7A:
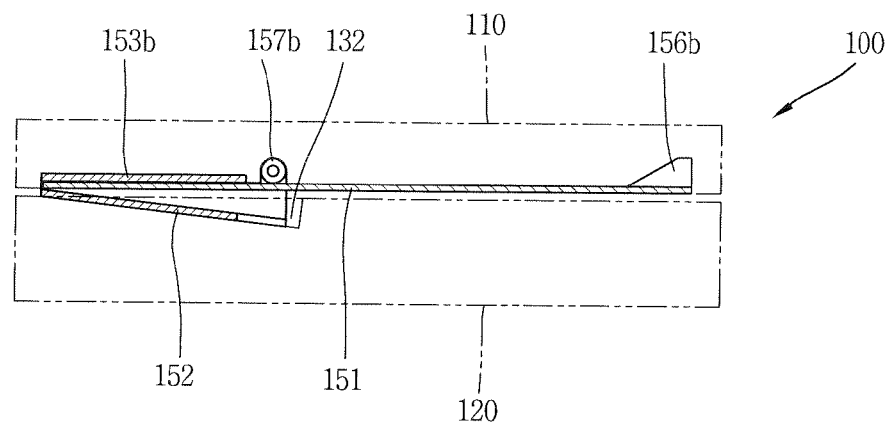
FIGS. 7A and 7B are cross sectional views of the mobile terminal 100 showing an exemplary operation of the slide module 150 in accordance with one embodiment of the present invention.
Figure 7B:
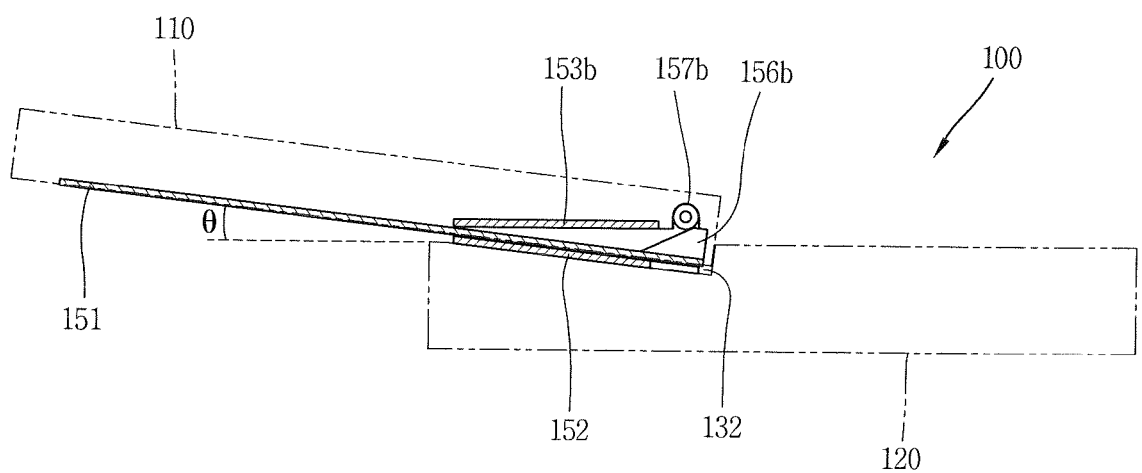

FIGS. 7A and 7B are cross sectional views of the mobile terminal 100 showing an exemplary operation of the slide module 150 in accordance with one embodiment of the present invention.

In FIG. 7A, the mobile terminal 100 is in the closed configuration. As the upper body 110 is slidably moved toward the open configuration, the rolling portion 157b rotates and maintains contact with the upper slide member 151 as the cam portion 156b approaches the rolling portion 157b. If the abovementioned rolling portion 158 is included in the mobile terminal 100, the rolling portion 158 also rotates and maintains contact with the upper slide member 151 as the upper body 110 is slidably moved toward the open configuration.

Once the cam portion 156b contacts the rolling portion 157b, the upper slide member 151 rotates to achieve an inclined position relative to the lower body 120. As shown in FIG. 7B, a portion of the upper slide member 151 is received by the recess 132 and makes contact with the lower surface of the lower slide member 152. Therefore, as further shown in FIG. 7B, one end of the upper body 110 is locked in the recessed portion 132, while another end of the upper body 110 is raised to a predetermined angle relative to the lower body 120.

Figure 8A:
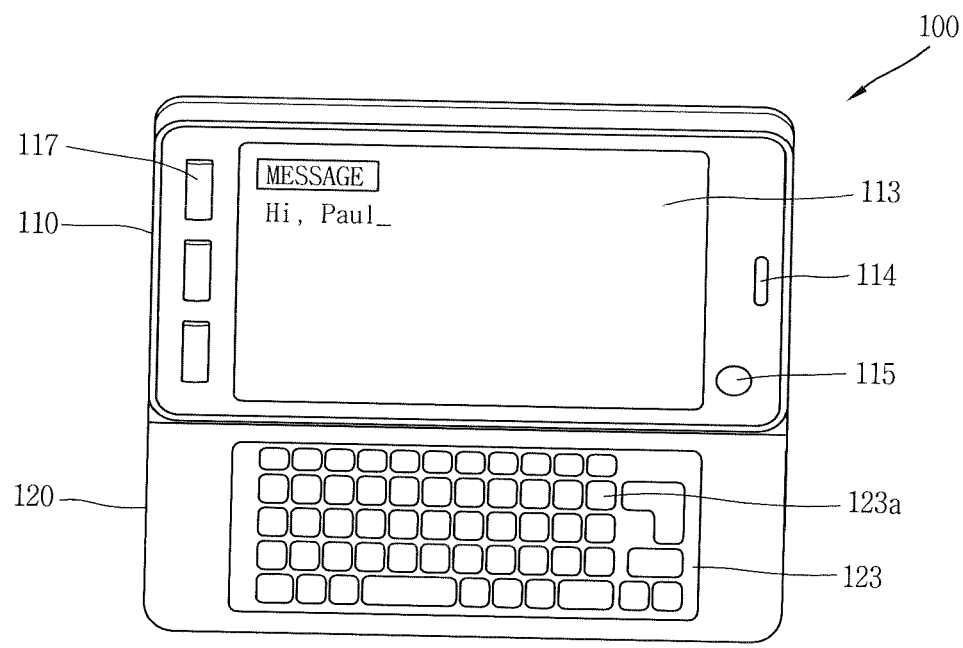
As shown in FIGS. 8A and 8B, the first display unit 113 can be configured to display a first screen and the second display unit 123 can be configured to display a second screen related to the first screen.
Figure 8B:
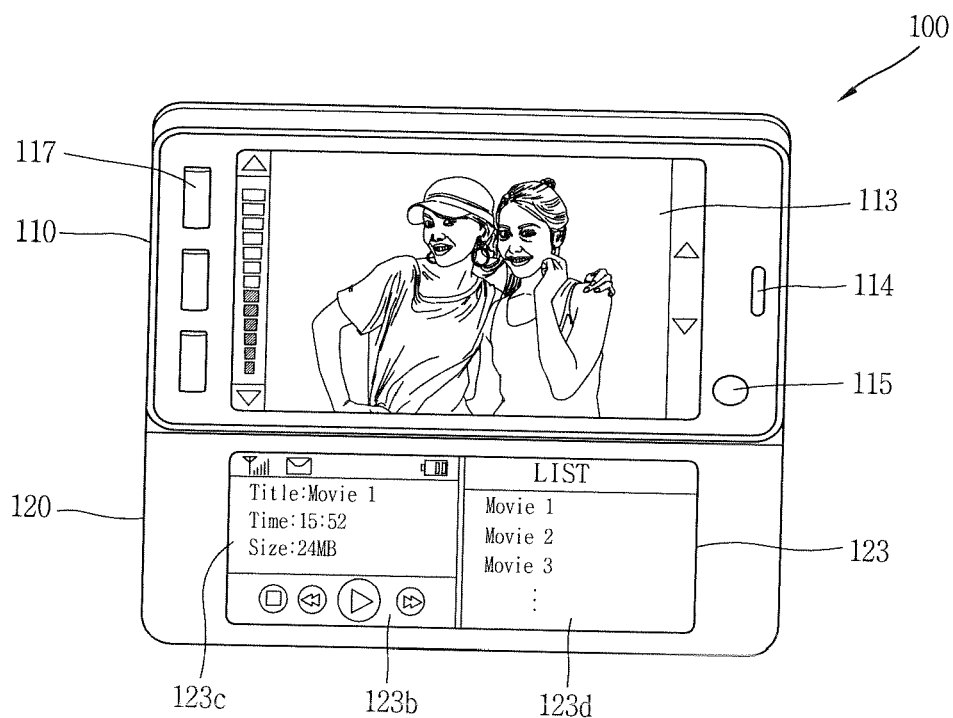

FIGS. 8A and 8B are plan views of a mobile terminal 100 showing an operation state of the mobile terminal 100 in accordance with one embodiment of the present invention.

In the closed configuration, the mobile terminal 100 can be used in the same manner as a bar type mobile terminal. For example, when the first display unit 113 is implemented as a touch screen, the first display unit 113 can be used to input data, such as numbers or text, and for performing various functions, such as a telephone call or a text message transmission/reception. In one embodiment, numbers, characters, symbols, or other data that can be input by a user can be displayed in the form of a soft key in the first display unit 113.

In one embodiment, when the mobile terminal 100 is switched from the closed configuration to the open configuration, additional functions of the mobile terminal 100, such as a multimedia function or a text input function, can be operated. In such an embodiment, the second display unit 123 can be operated to facilitate the additional functions.

As shown in FIGS. 8A and 8B, the first display unit 113 can be configured to display a first screen and the second display unit 123 can be configured to display a second screen related to the first screen.

For example, as shown in FIG. 8A, the second display unit 123 can be implemented as a touch screen displaying a keyboard 123 in a standard QWERTY configuration. The user can compose a message by touching the keys in the keypad 123. As shown in FIG. 8A, the data corresponding to each key touched by the user, such as a number or text, can be displayed in the first display unit 113.

For another example, as shown in FIG. 8B, broadcasts and video contents can be displayed in the first display unit 113. As also shown in FIG. 8B, icons 123b for controlling broadcasts, video content, and/or music content can be displayed in the second display unit 123, which can be implemented as a touch screen. Thus, the user can control the playing of broadcasts, video content, and/or music content by touching the icons 123b. As further shown in FIG. 8B, various visual information, such as detailed information 123c associated with a content being displayed in the first display unit 113 and a list 123d of content stored in the mobile terminal 100 can be displayed in the second display unit 123.

It should be understood that in other embodiments, a keyboard having tactile buttons can be disposed on the lower body 120 in place of the second display unit 123. Accordingly, the user can input data, such as characters, numbers, and/or symbols, by manipulating the tactile buttons representing the keys.

Figure 9A:
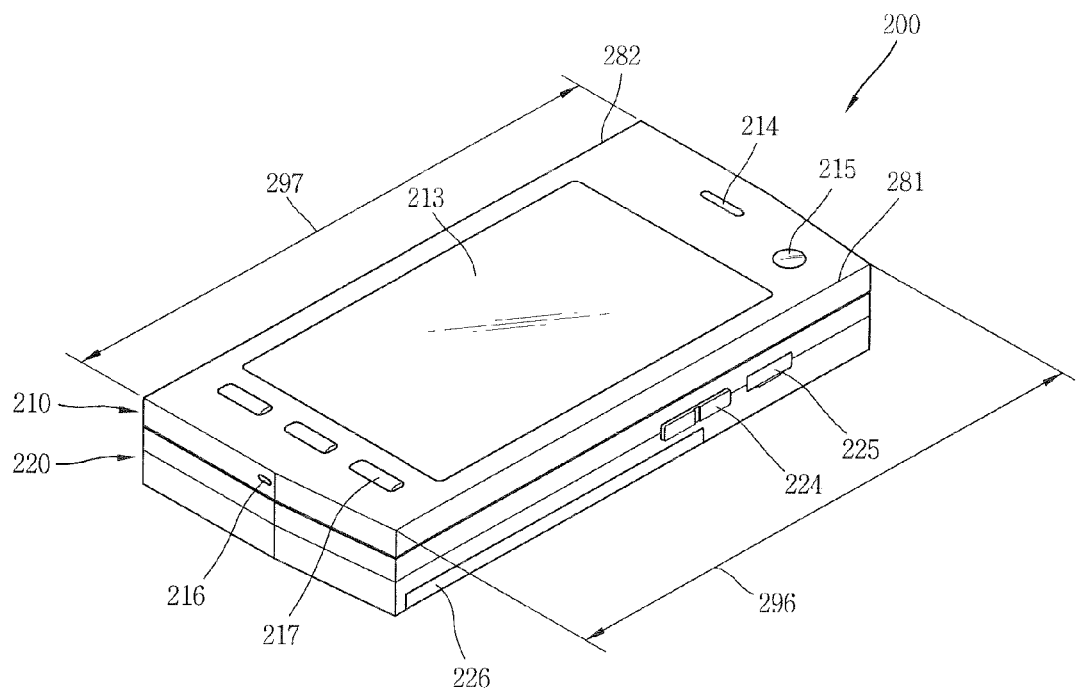
FIG. 9A shows a perspective view of a mobile terminal 200 in the closed configuration in accordance with one embodiment of the present invention.

FIG. 9A shows a perspective view of a mobile terminal 200 in the closed configuration in accordance with one embodiment of the present invention.

Figure 9B:
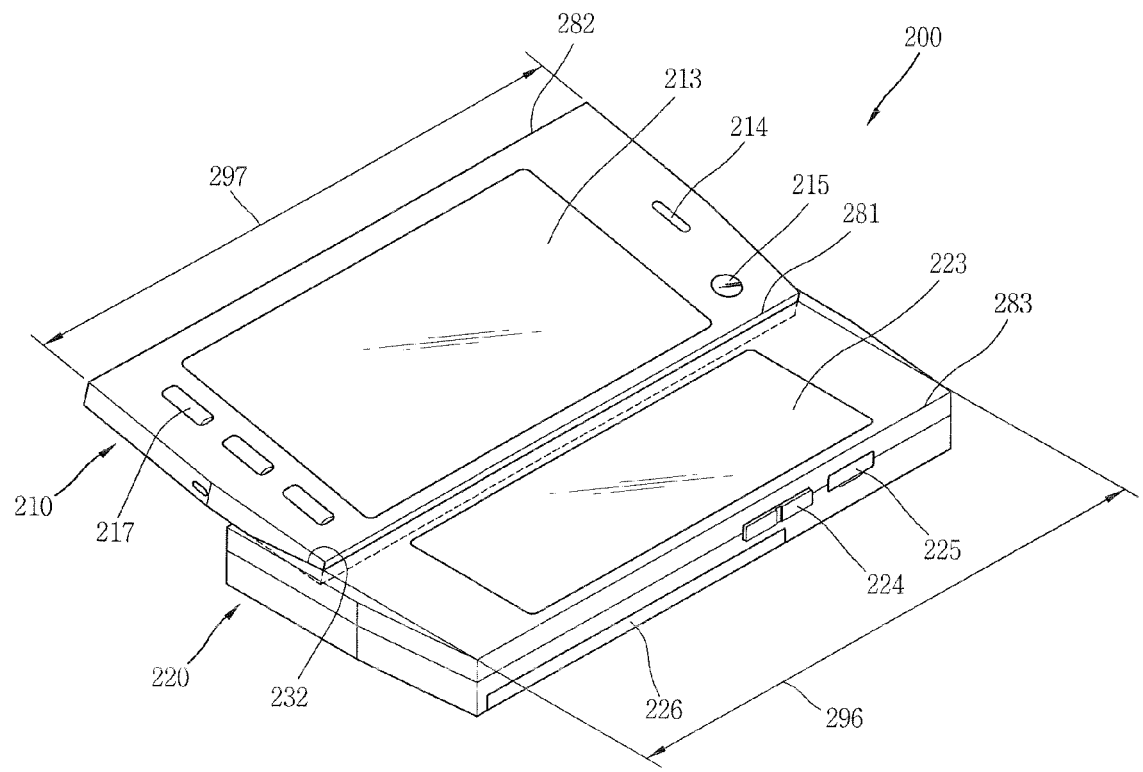
FIG. 9B shows a perspective view of the mobile terminal 200 in the open configuration in accordance with one embodiment of the present invention.

As shown in FIG. 9A, edge 281 of the upper body 210 can have a width 296, which is less than a width 297 of edge 282 of the upper body 210. In one embodiment, the edge 281 of the upper body 210 is locked in the recessed portion 232 when the mobile terminal 200 is in the open configuration, as shown in FIG. 9B. Thus, as shown in FIG. 9A, the width of the upper body 210 is tapered.

FIG. 9B shows a perspective view of the mobile terminal 200 in the open configuration in accordance with one embodiment of the present invention.

As shown in FIG. 9B, the edge 281 of the upper body 210 and the recessed portion 232 each have the same width 296. The edge 283 of the lower body 220 can have the same width 296 as the edge 281 of the upper body 210.

As also shown in FIG. 9B, the edge 281 of the upper body 210 is locked in the recessed portion 232 when the mobile terminal 200 is in the open configuration.

In the embodiment of FIGS. 9A and 9B, the edge 281 of the upper body 210 has a smaller width than the edge 282 of the upper body 210, thereby preventing the recessed portion 232 from being exposed. However, if the upper body 210 and the lower body 220 have the same width, such as width 297, the recessed portion 232 would be undesirably exposed along the sides of the lower body 220.

Figure 10A:
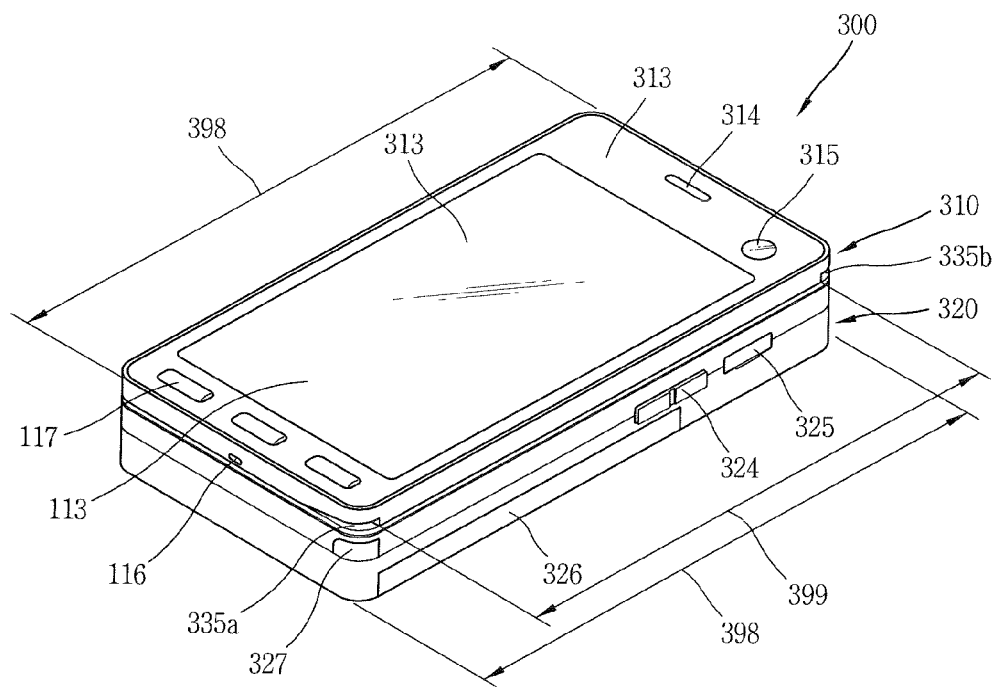
FIGS. 10A and 10B are perspective views respectively showing the closed and open configurations of the mobile terminal 300 in accordance with one embodiment of the present invention.
Figure 10B:
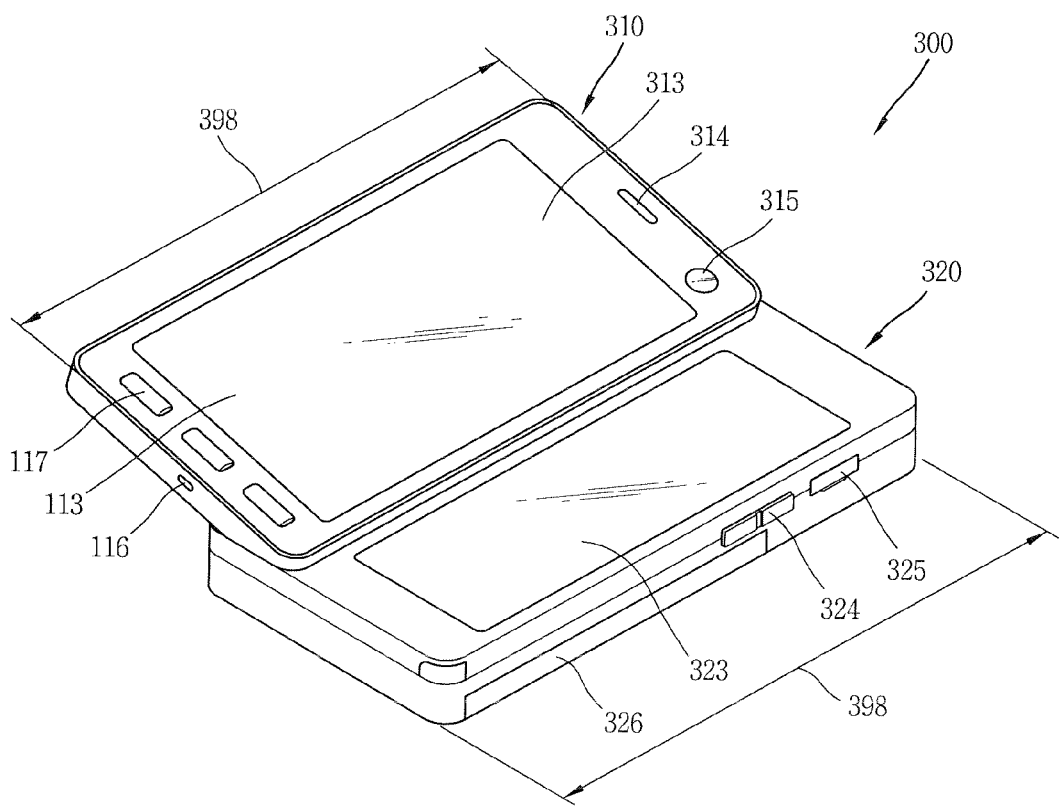

FIGS. 10A and 10B are perspective views respectively showing the closed and open configurations of the mobile terminal 300 in accordance with one embodiment of the present invention.

As shown in FIG. 1A, the upper body 310 and the lower body 320 each have the same width 398. A recessed portion (not shown in FIG. 10A) formed on the lower body 320 has a smaller width 399 than the width 398 of the upper body 310 and the lower body 320.

As also shown in FIG. 1A, lateral recessed portions 335a and 335b are formed at the sides of the upper body 310. The lateral recessed portions 335a and 335b are each inclined downward from the edge portion of the upper body 320.

As further shown in FIG. 1A, the distance between the lateral recessed portions 335a and 335b corresponds to the width 399 of the recessed portion formed in the lower body 320.

As shown in FIG. 10B, the lateral recessed portions 335a and 335b of the upper body 310 are locked in the recessed portion having the same width 399 when the mobile terminal 300 is in the open configuration.

Figure 11:
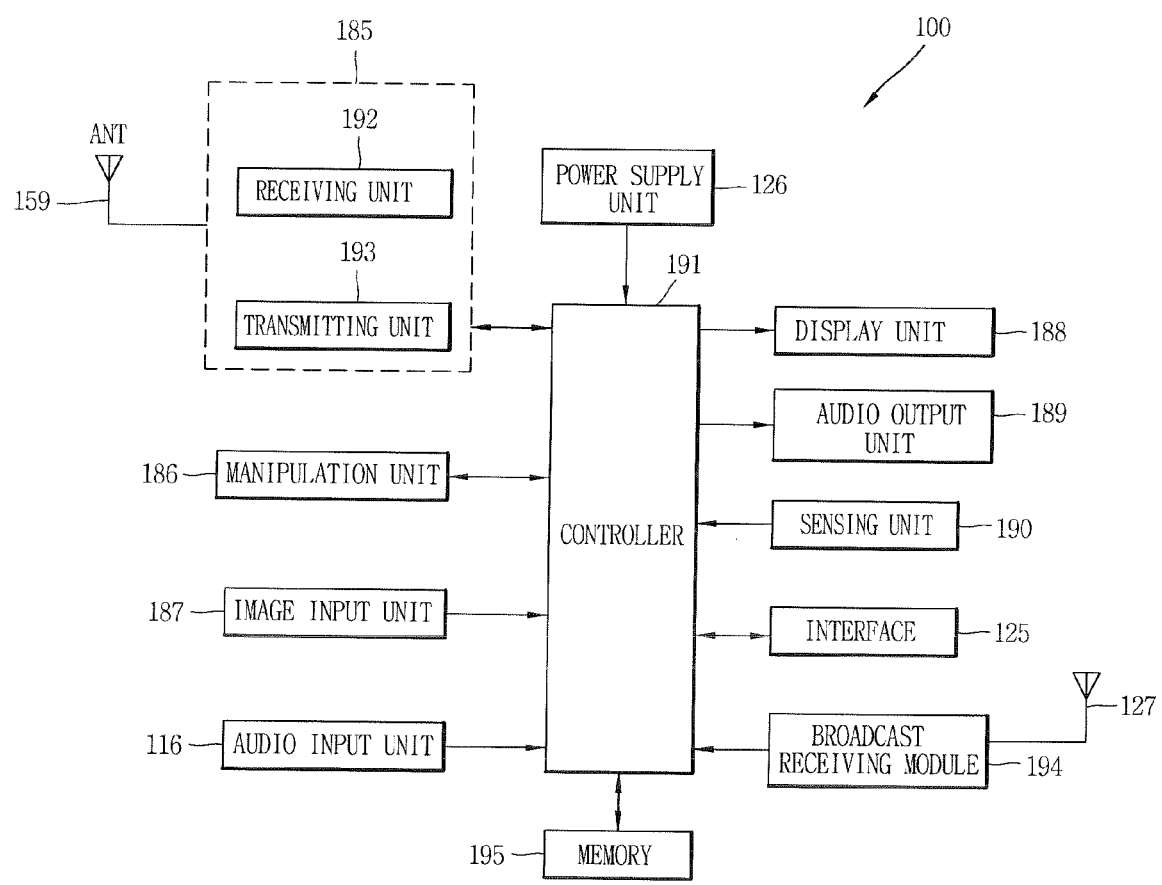
FIG. 11 is a block diagram of a mobile terminal 100 in accordance with one embodiment of the present invention.

FIG. 11 is a block diagram of a mobile terminal 100 in accordance with one embodiment of the present invention.

Referring to FIG. 11, the mobile terminal 100 includes a wireless communication module 185, a manipulation unit 186, an image input unit 187, an audio input unit 116, a display unit 188, an audio output unit 189, a sensing unit 190, an interface 125, a broadcast receiving module 194, a memory 195, a power supply unit 126, and a controller 191.

The controller 191 controls the general operation of the mobile terminal 100. For example, the controller 191 can be configured to control the processing for various functions, such as a voice call, a data communication, or a video call.

The wireless communication module 185 transmits and/or receives radio signals to and/or from a mobile communication base station via the antenna 159. The wireless communication module 185 includes a transmitting unit 193 for modulating and transmitting a signal and a receiving unit 192 for receiving and demodulating a received signal. For example, the wireless communication module 185 can enable transmission and/or reception of audio data, text data, video data, and control data.

The manipulation unit 186 can include one or more manipulation units, such as the first manipulation unit 117 and the second manipulation unit 124 described above, for enabling key input data provided by the user.

The image input unit 187 can include one or more image input units, such as the first image input unit 115 and second image input unit 128, for processing still or video images obtained by an image sensor during a video calling mode or in an image capturing mode. The processed image frame can be converted into image data that can be displayed on the first display unit 113 and/or the second display unit 128.

The image processed by the image input units 115 and 128 can be stored in the memory 195 or can be transmitted via the wireless communication module 185.

The audio input unit 116, for example, can be implemented as a microphone to receive sounds in a calling mode, recording mode, and a voice recognition mode and can processes the sounds into data. For example, the data can be converted to a format that can be transmitted to a mobile communication base station via the wireless communication module 185 in a call mode. For another example, the data can be stored in the memory 195 in a recording mode.

In one embodiment, the audio input unit 116 can include one or more noise canceling algorithms to cancel noise generated when receiving the sounds.

The display unit 188, which can include one or more display units, such as the first display unit 113 and the second display 123, can display information processed in the mobile terminal 100. For example, the first display unit 113 and the second display unit 123 can display a User Interface (UI) or a Graphic User Interface (GUI) associated with a call function when the mobile terminal 100 is in a call mode. For another example, the first display unit 113 and the second display unit 123 can display a captured or received image, a UI, and/or a GUI when the mobile terminal 100 is in a video call mode or an image capturing mode.

The audio output unit 189, which can include one or more audio output units, such as the first audio output unit 114 and the second audio output unit 131, can be configured to output audio data which has been received from the wireless communication module 185 in a call signal reception mode, a calling mode, a recording mode, a voice recognition mode, or a broadcast reception mode of the mobile terminal 100.

The audio output unit 189 can be further configured to output audio data stored in the memory 195 and to output an audio signal, such as a call signal reception sound or a message reception sound, associated with a function of the mobile terminal 100.

The sensing unit 190 senses a current status of the mobile terminal 100. For example, the sensing unit 190 can be used to determine whether the mobile terminal is in an opened or closed configuration, a location of the mobile terminal 100, or whether a user is interacting with the mobile terminal 100.

In one embodiment, the sensing unit can be configured to generate a sense signal for controlling the operation of the mobile terminal 100. For example, the sensing unit 195 can sense whether the mobile terminal 100 is in an opened or closed configuration and can output the result to the controller 191 to control the operation of the mobile terminal 100. In addition, the sensing unit 190 can perform a sensing function to determine whether the power supply unit 126 supplies power or whether the interface 125 is coupled to an external device.

The interface 125 can be configured to interface with one or more external devices. For example, the one or more external devices can include a wired/wireless headset, an external charger, a wired/wireless data port, and a card socket, such as a memory card socket or a SIM/UIM card socket. The interface 125 can be configured to receive data and power from the one or more external devices and can be configured to transfer the received data or power to each element of the mobile terminal 100. The interface 125 can also transmit data to an external device.

The memory 195 can include a storage medium, such as a hard disk, a flash memory, a RAM, a ROM, or a card type memory, such as an SD or XD memory. The memory 195 can permanently store a program that can be processed by the controller 191 and can temporarily store various data, such as a phone book, a message, a still image, or a video. The memory 195 can also store a program for controlling an operation of the mobile terminal 100 related to the present invention.

The broadcast receiving module 194 can receive a broadcast signal transmitted via a satellite or terrestrial waves and can convert the broadcast signal into a broadcast data format that is provided to the controller 191 and outputted to the audio output units 189 and the display unit 188. In addition, the broadcast receiving module 194 receives supplementary data, such as an Electric Program Guide (EPG) or a channel list, associated with a broadcast. The broadcast data converted in the broadcast receiving module 194 and the supplementary data can be stored in the memory 195.

The power supply unit 126 receives external or internal power and supplies power required for an operation of each element under the control of the controller 191.

Therefore, the present invention allows a user to view information displayed in the first display unit 113 on the upper body 110 more conveniently by tilting the first display unit 113 at a predetermined angle relative to the lower body 120. In addition, the present invention can provide a convenient user interface by implementing at least one of the first and second display units 113 and 123 as a touch screen.

The present invention also provides a slide module including one or more rollers for improving the relative sliding motion of the upper body 110 and lower body 120.

Although the present invention has been disclosed by referring to the above-mentioned embodiments, it should be noted that the aforementioned embodiments have been disclosed for only illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

What is claimed is:

1. A mobile terminal, comprising:
   an upper body;
   a lower body having a recessed portion formed on an upper surface of the lower body; and
   a slide module connecting the upper and lower bodies, wherein the slide module is configured to slidably move the upper body in a relative linear motion with respect to the lower body and to incline the upper body to an angle relative to the lower body using a tilting motion, the slide module comprising:
   an upper slide member fixed to the upper body;
   a lower slide member fixed to the lower body; and
   at least one cam portion formed on the upper slide member such that the at least one cam portion is configured to contact the lower slide member when the upper slide member is moved toward an open configuration using the relative linear motion, wherein the contact causes the upper slide member to be inclined when the upper slide member is moved to the open configuration using the tilting motion,
   wherein an inclined surface of the recessed portion is inclined relative to a sliding direction of the upper body toward the open configuration, and
   wherein the rear surface of the upper body is supported by the incline surface of the recessed portion when at least an end of the upper body is moved into the recessed portion by the tilting motion,
   wherein the at least one cam portion is protruded from an upper surface of the upper slide member and comprises an inclined surface along one direction,
   wherein while the upper slide member moves in a closed configuration for the open configuration, the inclined surface of the at least one cam portion contacts the lower slide member so as to cause the tilting motion.

2. The mobile terminal of claim 1, wherein the lower slide member comprises an inclined surface corresponding to the incline of the recessed portion and wherein the lower slide member is fixed on a mounting groove formed on the recessed portion.

3. The mobile terminal of claim 2, wherein slide rails formed on each side of the lower slide member define an area where the upper slide member slidably engages the lower slide member and enables the inclining of the upper slide member.

4. The mobile terminal of claim 3, wherein the slide rails each comprise a rail groove having a height which gradually increases towards a sliding direction of the upper body for achieving a closed configuration.

5. The mobile terminal of claim 3, wherein an inner surface of each of the slide rails comprises a curved portion configured to reduce a friction between the slide rail and the at least one cam portion.

6. The mobile terminal of claim 3, further comprising at least one rolling portion situated on each of the slide rails, wherein the at least one rolling portion is configured to contact a side of the upper slide member.

7. The mobile terminal of claim 1, further comprising a rolling portion situated on a lower surface of the upper body, wherein the rolling portion is configured to be in contact with an upper surface of the lower body.

8. The mobile terminal of claim 1, wherein a first width of the first side of a upper body is less than a second width of a second side of the lower body, wherein the first side is opposite to the second side, and wherein a third width of the recessed portion corresponds to the first width.

9. The mobile terminal of claim 1, wherein a first width of a first side of the upper body is less than a second width of a second side of the upper body, the first and second sides being opposite to one another, and wherein the first width corresponds to a third width of the recessed portion.

10. The mobile terminal of claim 1, wherein first and second edges of the upper body comprise lateral recessed portions, wherein a distance between the lateral recessed portions corresponds to a third width of the recessed portion.

11. The mobile terminal of claim 1, wherein the upper body comprises a first display unit for displaying a first screen and the lower body comprises a second display unit for displaying a second screen, wherein the second screen in associated with the first screen.

12. The mobile terminal of claim 1, wherein when the upper body is in a position that is inclined relative to the lower body, the first portion of the recessed portion and a lower surface of the upper body lie in respective planes that are substantially parallel.

13. The mobile terminal of claim 1, wherein the first portion and the second portion each define a single leg which respectively extend from the trough.

14. A mobile terminal, comprising:
   an upper body;
   a lower body comprising a recessed portion on a upper surface of the lower body; and a slide module connecting the upper and lower bodies, wherein the slide module is configured to slidably move the upper body in a first relative linear motion with respect to the lower body and to tilt the upper body at an angle relative to the lower body in a second motion, wherein one side of the upper body is situated in the recessed portion, the slide module comprising:

an upper slide member fixed to the upper body;

a lower slide member fixed to the lower body; and at least one cam portion formed on the upper slide member such that the at least one cam portion is configured to contact the lower slide member when the upper slide member is moved toward an open configuration using the first motion, wherein the contact causes the upper slide member to tilt when the upper slide member is moved to the open configuration using the second motion, wherein an inclined surface of the recessed portion is inclined relative to a sliding direction of the upper body toward the open configuration, and wherein the rear surface of the upper body is supported by the incline surface of the recessed portion when at least an end of the upper body is moved into the recessed portion by the second motion, wherein the at least one cam portion is protruded from an upper surface of the upper slide member and comprises an inclined surface along one direction, wherein while the upper slide member moves in a closed configuration for the open configuration, the inclined surface of the at least one cam portion contacts the lower slide member so as to cause the tilting motion.

15. The mobile terminal of claim 14, wherein slide rails formed on each side of the lower slide member define an area where the upper slide member slidably engages the lower slide member and enable tilting of the upper slide member.

16. The mobile terminal of claim 15, wherein the slide rails each comprise a rail groove having a height which gradually increases towards a sliding direction of the upper body for achieving a closed configuration.

17. The mobile terminal of claim 15, wherein an inner surface of each of the slide rails comprises a curved portion configured to reduce a friction between the slide rail and the at least one cam portion.

18. The mobile terminal of claim 15, further comprising at least one rolling portion situated on each of the slide rails, wherein the at least one rolling portion is configured to contact a side of the upper slide member.

19. The mobile terminal of claim 14, further comprising a rolling portion situated on a lower surface of the upper body, wherein the rolling portion is configured to be in contact with the upper surface of the lower body.

20. The mobile terminal of claim 14, wherein a first width of a first side of the upper body is less than a second width of a second side of the lower body, wherein the first side is opposite to the second side, and wherein a third width of the recessed portion corresponds to the first width.

21. The mobile terminal of claim 14, wherein a first width of a first side of the upper body is less than a second width of a second side of the upper body, the first and second sides being opposite to one another, and wherein the first width corresponds to a third width of the recessed portion.

22. The mobile terminal of claim 14, wherein first and second edges of the upper body comprise lateral recessed portions, wherein a distance between the lateral recessed portions corresponds to a third width of the recessed portion.

23. The mobile terminal of claim 14, wherein the upper body comprises a first display unit for displaying a first screen and the lower body comprises a second display unit for displaying a second screen, wherein the second screen in associated with the first screen.

24. The mobile terminal of claim 14, wherein when the upper body is in a position that is inclined relative to the lower body, the first portion of the recessed portion and a lower surface of the upper body lie in respective planes that are substantially parallel.

25. The mobile terminal of claim 14, wherein the first portion and the second portion each define a single leg which respectively extend from the trough.

* * * * *